United States Patent [19]

Blum et al.

[11] Patent Number: 5,162,136
[45] Date of Patent: Nov. 10, 1992

[54] PROCESS FOR INCREASING STRENGTH OF GLASS BY FORMING CERAMIC COATING ON GLASS SURFACE

[76] Inventors: Yigal D. Blum, 1010 Noel Dr., #28, Menlo Park, Calif. 94025; Robert M. Platz, 125 E. Santa Inez, San Mateo, Calif. 94401

[21] Appl. No.: 561,476

[22] Filed: Jul. 30, 1990

Related U.S. Application Data

[63] Continuation of Ser. No. 226,623, Aug. 1, 1988, abandoned.

[51] Int. Cl.⁵ ................ B05D 3/02; C03C 17/25
[52] U.S. Cl. .................... 427/226; 427/228; 427/126.2; 427/126.3; 65/60.8; 65/60.5; 65/901; 428/428
[58] Field of Search ............. 427/226, 168, 387, 228, 427/126.2, 126.3; 428/428, 426, 447, 446; 65/60.8, 60.5, 901; 106/287.1, 287.11, 287.13, 287.14; 524/442; 528/38

[56] References Cited

U.S. PATENT DOCUMENTS

| | | | |
|---|---|---|---|
| 1,960,121 | 5/1934 | Moulton et al. | 65/30.1 |
| 3,615,320 | 10/1971 | Junge et al. | 65/30.14 |
| 3,853,567 | 12/1974 | Verbeek | 106/44 |
| 3,892,583 | 7/1975 | Winter et al. | 106/55 |
| 4,370,385 | 1/1983 | Yoshida et al. | 428/429 |
| 4,395,460 | 7/1983 | Gaul | 428/408 |
| 4,404,153 | 9/1983 | Gaul, Jr. | 264/29.2 |
| 4,409,266 | 10/1983 | Wieczorrek et al. | 427/302 |
| 4,482,669 | 11/1984 | Seyferth et al. | 524/442 |
| 4,612,383 | 9/1986 | Laine et al. | 556/412 |
| 4,645,807 | 2/1987 | Seyferth et al. | 525/474 |
| 4,656,221 | 4/1987 | Kurita et al. | 524/731 |
| 4,666,872 | 5/1987 | Baney et al. | 501/88 |
| 4,668,642 | 5/1987 | Bujalski | 501/88 |
| 4,705,837 | 11/1987 | Seyferth et al. | 528/31 |
| 4,720,532 | 1/1988 | Seyferth et al. | 528/28 |
| 4,849,296 | 7/1989 | Haluska et al. | 428/457 |

FOREIGN PATENT DOCUMENTS

| | | |
|---|---|---|
| 58-55346 | 4/1983 | Japan . |
| 58-145642 | 8/1983 | Japan . |
| 59-190211 | 2/1985 | Japan . |

OTHER PUBLICATIONS

Coblenz, W. S., et al., "Formation of Ceramic Composites and Coatings Utilizing Polymer Pyrolysis", *Emergent Process Methods for High-Technology Ceramics*, Plenum Publishing Corporation, 1984, pp. 271-285.

Primary Examiner—Norman Morgenstern
Assistant Examiner—Roy V. King

[57] ABSTRACT

A method is disclosed for improving the rupture strength of a glass material which comprises coating an unannealed glass material with a tractable preceramic coating material capable of pyrolyzing to form a ceramic coating at a temperature not exceeding the annealing temperature of the glass material and heating the coated glass material to a temperature sufficiently high to permit pyrolysis of the pre-ceramic polymer without exceeding the annealing temperature of the glass for a period of time sufficient to form a ceramic coating on the surface of the glass material.

19 Claims, 7 Drawing Sheets

```
┌─────────────────────────────────────────────┐
│   COATING AN UNANNEALED GLASS MATERIAL      │
│   WITH A PRECERAMIC COATING MATERIAL        │
│   CAPABLE OF FORMING A CERAMIC COATING      │
│   AT A TEMPERATURE NOT EXCEEDING THE        │
│   SOFTENING TEMPERATURE OF THE GLASS        │
└─────────────────────────────────────────────┘
                      │
┌─────────────────────────────────────────────┐
│   HEATING THE COATED GLASS MATERIAL TO A    │
│       TEMPERATURE NOT EXCEEDING THE         │
│       SOFTENING TEMPERATURE OF THE GLASS    │
└─────────────────────────────────────────────┘
                      │
┌─────────────────────────────────────────────┐
│   MAINTAINING THE COATED GLASS AT THIS      │
│       TEMPERATURE FOR A TIME PERIOD         │
│   SUFFICIENT TO PYROLYZE THE PRECERAMIC     │
│   COATING MATERIAL AND FORM THE CERAMIC     │
│                   COATING                   │
└─────────────────────────────────────────────┘
                      │
┌─────────────────────────────────────────────┐
│   COOLING THE CERAMIC COATED GLASS TO       │
│   RECOVER A CERAMIC COATED GLASS            │
│   MATERIAL WITH IMPROVED RUPTURE            │
│                  STRENGTH                   │
└─────────────────────────────────────────────┘
```

*Figure 7*

PROCESS FOR INCREASING STRENGTH OF GLASS BY FORMING CERAMIC COATING ON GLASS SURFACE

This application is a continuation of application Ser. No. 07/226,623, filed Aug. 1, 1988, abandoned.

BACKGROUND OF THE INVENTION

1. Field of the Invention

This invention relates to the strengthening of glass by forming a ceramic coating on the glass surface. More particularly, this invention relates to a process for strengthening glass by coating it with a preceramic layer and then converting the preceramic layer to a ceramic coating.

2. Description of the Related Art

Microcracks on the surface of glass articles are the main reason for the catastropic failure of glass under considerably low tensile load. Therefore, in the manufacture of glass materials such as, for example, glass sheets or shaped objects such as a glass bottle, it is known to protect the glass surface from abrasion and formation of microcracks by coating it with organic polymer materials. For example, Yoshida et al U.S. Pat. No. 4,370,385 describes coating a glass vessel with an organopolysiloxane composition to provide a scuff-masking coating over the glass.

Wieczorrek et al U.S. Pat. No. 4,409,266 provides a shatterproof coating on glass by applying to the glass surface a silane adhesion promoter and a two component system which reacts to form a polyurethane binder.

Kurita et al U.S. Pat. No. 4,656,221 conceals graze marks on a glass bottle by coating the glass with a composition formed from polydiorganosiloxane components and a surfactant. The coating is applied to the glass surface as an emulsion and allowed to air dry.

However, the problem with the use of organic coatings on glass is that the coatings are not very hard, suffer from weathering degradation, and do not increase the actual strength of the glass.

In general, the formation of ceramic coatings on substrates through the pyrolysis of preceramic polymer coatings is known. For example, Gaul, in U.S. Pat. Nos. 4,395,460 and 4,404,153 forms a silicon carbide coating on a substrate by coating the substrate with a polysilazane polymer and then heating the coated substrate in an inert atmosphere or in a vacuum to an elevated temperature of at least 750° C.

Seyferth et al U.S. Pat. Nos. 4,482,669; 4,720,532; 4,705,837; and 4,645,807 teach forming an oxidation-resistant coating on otherwise oxidizable materials such as pyrolytic graphite by application of a preceramic polymer coating over the materials followed by pyrolysis of the preceramic coating to form a ceramic coating. The preceramic polymer materials respectively used in the Seyferth et al patents include (1) polysilazanes that are synthesized by strong base catalyzed polymerization of cyclomethylsilizane, which is the ammonolysis product formed by reacting anhydrous ammonia with a mixture of dihalohydridesilanes and trihalosilanes; (2) polymers formed by reacting polysiloxane with a polysilylamide, which is an intermediate potassium salt of the polymer in (1); and (3) polymers formed by reacting a organopolysilane of the formula $[(RSiH)_x(RSi)_y]_N$ with alkali metal amides or silylamides.

Coblenz et al, in an article entitled "Formation of Ceramic Composites and Coatings Utilizing Polymer Pyrolysis", on pp 271–285 of a publication entitled "Emergent Process Methods For High-Technology Ceramics", edited by Davis et al and published in 1984 by Plenum Publishing Corporation, describe the coating of carbon and silicon nitride materials with a dimethylsiloxydiphenylsiloxycarborane polymer and with a silazane oligomer. They report that the resulting coatings were of poor quality with shrinking and cracking of the coatings noted.

Winter et al U.S. Pat. No. 3,892,583 and Verbeck U.S. Pat. No. 3,853,567 describe the formation of shaped articles of homogeneous mixtures of silicon carbide and silicon nitride. The homogeneous mixtures are also said to be useful in forming films, flakes, and coatings.

Baney et al U.S. Pat. No. 4,666,872 describes coating substrates with $R_3SiNH$-containing silazane polymers to which has been added certain precious metals, followed by heating the substrate to an elevated temperature of at least 750° C. in an inert atmosphere or vacuum to form a ceramic coated article.

Bujalski U.S. Pat. No. 4,668,642 discloses coating substrates with $R_3SiNH$-containing silazane polymers to which has been added certain boron compounds, followed by heating the substrate to an elevated temperature of at least 750° C. in an inert atmosphere or vacuum to form a ceramic coated article.

While the use of such ceramic materials may generally protect the surface of a substrate against scratching or other abrasive action, as well as imparting some oxidation protection for oxidizable substrates such as the above described carbonaceous materials, such coatings are not generally known to impart any physical strength to the substrate itself when applied as thin layers, e.g., less than 1 millimeter in thickness.

Glass materials, however, in addition to needing surface protection such as afforded by the above discussed organic coating materials, need physical strengthening as well. For example, despite the theoretical high strength of silicon-based glass, e.g., in the range of 2000 kpsi, the actual strength of a manufactured glass article may be lower by more than two orders of magnitude, e.g., to a level of 5–20 kpsi.

This dramatic reduction in rupture strength may be explained by the presence of "Griffith flaws", which probably exist on the molecular level, and which serve as weak points to initiate crack propagation and lead to glass failure under stress. Of course, large visible cracks formed by abrasion forces further degrade the rupture strength. However, this latter problem is solved, at least in part, by the aforementioned organic coatings applied over the glass surface.

Stresses and strains formed during the arrangement of the silicate polymers when molten glass is shaped are also responsible for a decrease of strength. The stresses can be relieved by an annealing process which increase the glass strength by a factor of 2. In contrast, however, inducing strains by a tempering process may provide glasses that withstand tensile loads of 40–60 kpsi. However, such tempering processes are not always practical in some forms of glass manufacture, such as, for example, glass container or glass fiber manufacturing.

It would, therefore, be advantageous to provide an economical means for increasing the rupture strength of glass materials. Quite surprisingly, we have discovered a process for treating a glass surface to impart increased rupture strength to the glass body.

SUMMARY OF THE INVENTION

It is, therefore, an object of this invention to provide a process for treating the surface of a glass material to increase the rupture strength of the glass material.

It is another object of this invention to provide a process for treating the surface of a glass material to increase the rupture strength of the glass material wherein a ceramic coating is formed on the glass surface.

It is yet another object of this invention to provide a process for treating the surface of a glass material to increase the rupture strength of the glass material by pyrolyzing a preceramic coating material applied to the surface of the glass material to form a ceramic coating on the glass surface.

It is still another object of this invention to provide a process for treating the surface of a glass material to increase the rupture strength of the glass material by pyrolyzing, at a temperature up to the softening temperature of the glass, a preceramic coating material applied to the surface of the glass material to form a ceramic coating on the glass surface.

It is a further object of this invention to provide a process for treating the surface of a glass material to increase the rupture strength of the glass material by pyrolyzing a preceramic coating material which has been preselected to provide a desired minimum viscosity, wetting and adhering properties, and ceramic yield; and which is applied to the surface of the glass material to form a ceramic coating on the glass surface upon pyrolysis.

It is yet a further object of this invention to provide a glass material having a ceramic coating formed thereon to increase the rupture strength of the glass material by pyrolyzing a preceramic coating material which has been preselected to provide a desired minimum viscosity, wetting and adhering properties, and ceramic yield; and applied to the surface of the glass material to form a ceramic coating on the glass surface upon pyrolysis.

These and other objects of the invention will be apparent from the following description and accompanying flow sheet.

In accordance with the invention, a method is provided for improving the rupture strength of a glass material which comprises: coating the glass material with a tractable preceramic coating material capable of pyrolyzing to form a ceramic coating at a temperature not exceeding the softening temperature of the glass material; and heating the coated glass material to a temperature sufficiently high to permit pyrolysis of the preceramic polymer without exceeding the softening temperature of the glass for a period of time sufficient to form the ceramic coating on the surface of the glass material.

DETAILED DESCRIPTION OF THE INVENTION

The invention provides a process for improving the rupture strength of a glass material by forming a ceramic coating on the surface of the glass material. The ceramic coating is formed by applying a preceramic coating material to the surface of the glass and then pyrolyzing the preceramic coating material at a temperature sufficiently high to permit formation of the ceramic coating without, however, exceeding the softening temperature of the glass material. By "softening temperature" is meant the temperature at which the glass will begin to change its shape.

When glass rods are coated with ceramic, in accordance with the practice of the invention, the rupture strength of the glass rod may be increased, for example, from a nominal 18.2 kpsi ±2.3 kpsi up to from at least 40 up to 60 kpsi, with some increases up to 80 kpsi, and in some other instances, up to as high as 90–110 kpsi.

The preceramic coating material, e.g., a polymer or precursor, from which the ceramic coating will be formed may comprise any tractable inorganic or organometallic polymer or compound capable of wetting and adhering to the surface of the glass material and capable of pyrolyzing to form a ceramic coating on a glass substrate at a temperature which does not exceed the softening temperature of the glass substrate. By way of example, and not of limitation, the ceramic coatings which may be formed from such precursors may contain $Si_3N_4$, SiC, C, $SiO_2$, $ZrO_2$, $Al_2O_3$, $BC_4$, BN, TiC, $W_2C$, $Mo_2C$, TiN, as well as other ceramics known for their strength and hardness, including other silicides, borides, nitrides, carbides, or oxides, or mixtures thereof.

Examples of preceramic coating materials such as polymers or precursors from which such ceramic coatings may be formed comprise polysilazane, including poly-N-methyl silazane (PNMS) and/or polycyclomethylsilazane (PCMS), from which ceramic coatings containing mainly silicon, nitrogen, and optionally carbon (depending upon the atmosphere used during pyrolysis) may be formed; polysiloxazane; polysiloxane, including polymethylsilsesquioxane and polyhydridomethylsiloxane from which ceramic coatings containing Si and O can be formed; polysilanes; polycarbosilanes; polyboranes; polycarboboranes; polyaminoboranes; and polyaminotitanium.

Methods of formation of the preceramic coating materials when such coating materials comprise polymers, for example, of polysilazane, polysiloxazane, and polysiloxane suitable for use as coating materials in the practice of the present invention may be found in copending Blum et al U.S. patent application Ser. No. 012,874, filed Dec. 1, 1986 and assigned to the assignee of this invention, cross-reference to which is hereby made.

The term "tractable", as used herein with respect to the preceramic coating material used in the practice of the invention, is intended to define a material which is soluble, meltable, or malleable, or which can be processed like an organic polymer to form a desired shape, i.e., in this case, a coating on a glass substrate.

By use of the terms "pyrolysis" or "pyrolyze" is meant the transformation of the preceramic coating material or precursor, to a ceramic product by a heating process in which a multiple thermal reactivity occurs, or the reaction of such materials with oxygen or other gases present during the pyrolysis to form materials separable from the resulting ceramic coating on the glass material. It also may be defined as the minimum temperature at which formation of a ceramic coating occurs for any given preceramic coating material, e.g., polymer or precursor by losing its functional groups or nature coincidentally with the extensive formation of crosslinking.

The glass material which may be strengthened by formation of the ceramic coating thereon, in accordance with the invention, may comprise any particular shape, including flat sheets; shaped objects such as containers, rods, or the like; or fibrous glass such as used, for example, in reinforced plastics, insulation, or fiber optics.

The glass material may include, by way of example and not of limitation, boron oxide based glasses, phosphoric oxide based glasses, and silicon oxide (silica) based glasses. Such glasses, particularly the more common silica-based glasses, i.e., a glass containing at least 50 wt. % silica, may further include, one or more additives therein such as: boron oxide (e.g., a borosilicate glass); oxides of alkali metals and alkaline earth metal oxides, and mixtures thereof such as oxides of lithium, sodium, potassium, calcium, strontium, and barium (e.g., a soda-lime glass); oxides of rare earth elements such as cerium, lanthanum, neodymium, and praseodymium; and oxides of various kinds of metals such as aluminum, antimony, chromium, cobalt, copper, iron, manganese, nickel, tantalum, thorium, tin, titanium, uranium, vanadium, and zirconium. Also included are silicas containing nitrogen, fluorides, chlorides, phosphates, selenides, or sulfates as additives. Other examples of non-silicon and non-oxide glasses useful in the invention include halides such as $BeF_2$, $ZnCl_2$, and $NdF_3$; and chalcogens such as $As_2Se_3$, $GeS_2$, and $As_2S_3$.

The term "glass" as used herein is intended to define an amorphous solid which is smoothly and reversibly converted to a liquid by the application of heat. It also may be defined as a supercooled liquid of extremely high viscosity which may be considered as a solid solution of fused materials such as silicates, borates, or phosphates of varying composition with or without further additives.

It should be noted that the glass to which the preceramic coating material is applied may be annealed prior to application of the preceramic coating, if desired. However, it has been found that such an annealing process prior to coating is not necessary for achieving the desired increase in rupture strength of soda lime glass rods and may, in fact, be detrimental at times as will be shown below in the data presented in the examples.

The preceramic coating material may be applied to the glass substrate by any convenient method such as by brushing, spraying, dipping, painting, spinning, or the like. The preceramic coating material is applied to the glass substrate in an amount sufficient to provide, upon subsequent pyrolysis, a ceramic coating of from about 0.01 to about 20 microns, preferably from about 0.05 to about 4 microns, and at least from about 0.01 to 0.05 microns. Preferably, the desired ceramic coating thickness is achieved in a single coating layer, i.e., without the use of several built up layers. However, if desired, the coating process may be repeated to build up the desired thickness without the formation of cracks in the developed ceramic coating.

Achieving the desired thickness of the eventual ceramic coating layer on the glass material is related to both the initial coating thickness of the preceramic coating material and the ceramic yield of the preceramic coating material, e.g., polymer or precursor. The coating thickness of the preceramic coating material is, in turn, related to the viscosity of the coating material solution and the amount of solvent added to it to permit it to be applied to the surface of the glass. The ceramic yield is related to: (1) the molecular structure with reference to whether the coating material comprises a branched, cross-linked, or ring type polymer; (2) the molecular weight of the coating material with higher molecular weight polymers favored because of the higher ceramic yield of such materials; (3) the latent reactivity of the coating material that allows thermosetting properties and further cross-linking as desired in (2); and (4) small amounts of extraneous organic groups.

Generally speaking, to achieve the desired ceramic coating thickness uniformly across the glass surface, the preceramic coating material should have a sufficient molecular weight, e.g., be sufficiently polymerized, to provide a ceramic yield of at least 35 wt. % and a minimum viscosity, after removal of solvent, of at least 1-3 poise so that the coating will remain in a uniform thickness on the glass material as the coating is heated to the pyrolysis temperature.

The term "ceramic yield" of the preceramic coating material, such as a precursor or preceramic polymer, upon pyrolysis, as used herein, is intended to define the ratio of the weight of the ceramic coating after pyrolysis to the weight of the coating before pyrolysis.

In some instances the preceramic coating material, although sufficiently polymerized to achieve the desired minimum ceramic yield, will have a viscosity sufficiently low to permit it to be applied to the glass material as a uniform and homogeneous coating without the necessity of diluting the coating material in a solvent, i.e., the "tractable" coating material, such as a polymer, will be malleable, or, by application of heat, meltable.

However, in other instances, the preceramic coating material will need to be diluted to lower the viscosity sufficiently to facilitate application of the preceramic coating material as a coating on the glass surface and to control the thickness of the coating. In such cases, the preceramic coating material must be capable of being dissolved in a solvent which may later be removed from the coating without negative impact on the desired formation of the ceramic coating layer, i.e., the "tractable" coating material must be soluble.

Thus, in any event, the preceramic coating material, such as a polymer or precursor, used must not only be of sufficiently high molecular weight to achieve the desired minimum ceramic yield, but it must be "tractable" as well, as previously defined.

The preceramic coating material may be applied to the glass material at ambient temperature, i.e., about 20-25° C. or either the coating material or the the glass material may be at an elevated temperature. For example. the glass material may be preheated up to a temperature as high as, for example, about 50° C. below the softening temperature of the particular glass prior to coating the glass material with the preceramic coating material.

The term "ceramic precursor" as used herein is intended to include organometallic compounds, inorganic polymers, and organometallic polymers; while the term "preceramic polymer" is intended to define a polymer with any number of monomeric units which is sufficient enough to form ceramic compositions upon pyrolysis. Both terms are intended to be included in the term "preceramic coating material".

The "ceramic" which is formed by the pyrolysis may be defined as an inorganic material that forms a highly cross-linked network of covalent (sigma) bonds which may contain additional coordination bonds. In most cases, except carbon, the ceramic material contains at least one metal atom and one nonmetal atom. In some cases both are metals or metalloids, e.g., borides and silicides, or non-metals, e.g., PN, $AsS_3$, or $PO_3$. The ceramic material can be in an amorphous, crystalline, or glassy form and usually is stable at high temperature.

The preceramic coating material on glass may be pyrolyzed by heating the coated glass material up to a maximum temperature not exceeding the softening temperature of the glass material. For example, for a conventional soda-lime glass, containing 10 to 20 wt. % sodium oxide and 5 to 15 wt. % calcium oxide, the pyrolysis temperature should not exceed about 590° to 610° C.

The minimum temperature to which the coated glass must be heated will be determined by the particular preceramic coating material used and the minimum temperature at which a ceramic material may be formed from such a preceramic coating material. Thus, the minimum pyrolysis temperature must be at least at, and preferably above, the temperature at which the preceramic coating material converts to a ceramic material. This determination of the conversion of the preceramic coating material to a ceramic material may be TGA, IR, MS, and elemental analysis.

The minimum temperature, however, must be high enough to permit organic groups contained in the preceramic coating material, e.g., polymer or organometallic compound to be pyrolyzed, leaving only an inorganic ceramic network. For example, when a poly-N-methyl silazane polymer having a molecular weight of 800-3000 Daltons is used, the minimum temperature needed to remove extraneous methyl groups from the coating and to form the ceramic material is about 450-550° C.

The preceramic coating material may be pyrolyzed to convert it into a ceramic coating using a variety of heating schedules, including different heating rates, dwell times at the maximum temperature, and cooling rates, depending upon the specific material used.

For soda-lime glass, for example, the glass may be heated up to about 590° C. at rates varying from 30° C./hour up to 3000° C./hour. In one embodiment, coated soda-lime glass material may be rapidly heated up to a temperature of about 300° C., i.e., heated at a rate as fast as about 3300° C./hour, then heated to about 350° C. at a rate of about 300° C./hour, followed by a slower heating from about 350° C. up to about 450° C. of about 30° C./hour followed by a resumption of the fast rate (300° C./hour) up to from about 500° C. to the softening temperature of the glass, preferably from about 550° C. to the softening temperature of the glass, and most preferably from about 10° C. below the softening temperature of the glass up to a temperature not exceeding the softening temperature of the glass. This maximum temperature will, therefore, vary with the particular glass used. In the case of coated soda-lime glass, the pyrolysis temperature used to form the ceramic coating should not exceed about 590° C.

In another embodiment using soda-lime glass, the coated glass may be quickly heated to the pyrolysis temperature by inserting the glass material coated with the preceramic polymer or precursor into a furnace which has already been heated to the desired pyrolysis temperature. The coated glass material quickly heats to the temperature of the furnace in this method, for example, reaching a temperature of 580° C. in 10 minutes. Although different schedules of heating provide different levels of rupture strength, all schedules provided positive effects.

In a third embodiment, the preceramic polymer or precursor may be sprayed as a solid, liquid, or aerosol on the hot glass object as it emerges from a mold or shaping means. The temperature of the hot glass object may be measured, for example, by an optical pyrometer and when the glass has cooled down to the annealing temperature or below, the preceramic polymer or precursor may be sprayed onto the hot glass surface.

In any of the embodiments used for heating the coated glass to the pyrolysis temperature, the coated glass is held at the pyrolysis temperature for a period of time sufficient to permit formation of the ceramic coating and to develop the desired strength. It will be understood that if less than the optimal dwell time is used for the particular preceramic coating and glass material, a ceramic coating may be formed over the glass in accordance with the invention, but the coated glass may not have as much strength as is possible if the dwell time is extended. This will then be a trade-off between desired strength and process economics.

The holding or dwell time of the coated glass at the pyrolysis temperature may, therefore, vary from a minimum of 0 minutes, preferably at least about 5 minutes, and most preferably at least about 90 minutes, up to a maximum time of about 2 hours. Longer time periods may be used, but are usually unnecessary and, therefore, not economically justifiable. In some instances shorter dwell times of, for example, 30-60 minutes may be used even though maximum strength has not been developed if the economics of the process justifies the trade-off of reduced dwell time with reduced strength.

It should be further noted, with respect to the period of time used to initially heat the coated glass material up to the pyrolysis temperature, that it is desirable, from a standpoint of economics, to conduct the warm up period, dwell period at the pyrolysis temperature, and cooling of period in as short a period of time as possible. Preferably, the entire process is carried out in a period of about 2 hours.

The coated glass material, during both the temperature ramp up period and the dwell period, may be maintained in an inert atmosphere such as argon, or a nitrogen-containing atmosphere such as $N_2$, ammonia, a wet air atmosphere, or a dry air atmosphere, depending upon the chemical constituents of the preceramic polymer and the desired ceramic coating composition.

For example, the formation of a ceramic with Si—O bonds is favored when using an air atmosphere whereas the formation of a ceramic with Si—N bonds is favored when the preceramic polymer contains both silicon and nitrogen and either an inert or a nitrogen-containing atmosphere is used during the entire pyrolysis period. By the entire pyrolysis period is meant from the time the coated glass is placed in the furnace at room temperature until the temperature during cooling again reaches 200° C.

The ceramic coated glass material must also be slowly cooled to achieved the desired increase in rupture strength. The cooling rate may range from not exceeding about 100° C./minute, and preferably not exceeding about 30° C./minute, to most preferably not exceeding about 10° C. per minute, until the ceramic coated glass reaches a temperature of about 300° C., after which it may be allowed to cool to room temperature without any further control of the rate of cooling.

As stated above, glass materials having such a ceramic coating formed on the surface thereof have been found to have the rupture strength of the glass material increased, for example, from a nominal 18.2 kpsi ±2.3 kpsi up to from at least 40 up to 60 kpsi, with increases up to 80 kpsi, and even up to as high as 90–110 kpsi for single rods in some specific experiments.

While we cannot fully explain the reasons for such dramatic increases in the rupture strength of the ceramic coated glass material and we do not wish to be bound by any particular theory a to why such strength increases occur, we have postulated several reasons for such rupture strength increases. First of all, we have theorized that the ceramic coating may interact with the glass in a manner not unlike that of tempered glass wherein glass is heated to a value near the softening point after which it is removed from the furnace and the surfaces quickly cooled. While the surfaces instantaneously contract and become rigid, the interior glass is still fluid and expanded. Cooling rates and contraction of the glass are restrained by the rigid surface layer. The surfaces become highly compressive and are resisted by the opposing forces of internal tensile stresses. Accumulation of forces then causes glass strengthening.

We believe it may be possible that the preceramic may produce the same phenomenon during heating. During pyrolysis, the soft polymer transforms to a highly crosslinked, brittle product with exceptionally high tensile strength, higher density, and large weight loss. These preceramic characteristics should result in high shrinkage and rigidity in the final coatings. Mismatch of the thermal expansion coefficient between the developed ceramic coating and the soft glass at the annealing point is a second explanation for such phenomenon. If the value of the ceramic coating is lower than the glass, its contraction during the cooling period will stress the glass surface and form the "pseudo tempering" effect.

We have also postulated that since polymer derived ceramic fibers have an extremely high tensile strength, if the ceramic coatings have a high tensile strength, then the strained coatings will provide highly compressive surfaces. Such coatings may form a mechanical barrier to the rupture load by dispersing the forces from a focused area, beneath the center of the load.

Such a compression formed by the coatings also suggests the possibility of the healing of "Griffith flaws", invisible, molecular size, surface flaws formed in the surface of the glass material. A compressive layer over such postulated flaws may force their healing or lower their energy by chemical interactions.

In any event, the resulting increase in the rupture strength of the coated glass was totally unexpected. The following examples will serve to further illustrate the invention, including some of the parameters of the process.

EXAMPLE I

An N-methylsilazane oligomer (ONMS) was prepared for use as a preceramic coating material in the following manner. Into a flame-dried, three-necked flask equipped with an overhead mechanical stirrer and a nitrogen inlet was placed 500 mL anhydrous ether. The loaded vessel was cooled to $-70°$ C. in a dry ice-/acetone bath. Dichlorosilane (150 g; 1.5 mol) was then condensed into the flask. An excess of 300 ml of monomethylamine was then added over a 2-hour period. The reaction mixture was stirred for an additional 2 hours. The flask was then allowed to warm slowly overnight to room temperature. The contents were diluted with 500 ml ether. The reaction mixture was filtered, and the solids were rinsed with ether and THF. The solids were then placed in a 2-liter Erlenmeyer flask and stirred for 10 minutes in 500 ml boiling THF. The mixture was filtered hot. The extraction was repeated, and the solids were rinsed with an additional 500 ml hot THF. With this extraction method followed by solvent evaporation, the yield was 60–75%. The viscous oligomers obtained after evaporation of the solvent had normal average molecular weight $(\overline{Mn})$ of $\overline{Mn} = 800–1250$ Daltons. More than 85–95% of original product material remained after high vacuum distillation (150° C./300 micrometers) having $\overline{Mn} \geq 1400$ D. Soxhlet extraction can be used for the above cake extraction.

EXAMPLE II

High molecular weight poly-N-methylsilazane (PNMS) was also formed from the oligomer formed in Example I. To 50 g N-methylsilazane $[H_2SiNCH_3]_{x \sim 17}$ $(\overline{Mn} = 1050)$ was added 100 mg $Ru_3(CO)_{12}$, and the mixture was heated at 90° C. Samples were taken out of the solution and measured by gel permeation chromatography (GPC), vapor phase osmometry (VPO) and rheometry instruments. All samples, including starting material, show a very broad distribution. The molecular weight $(\overline{Mn})$ observed increases from 1050 Daltons in the starting materials to approximately 2500–3000 Daltons after 100 hours. Although increases in $\overline{Mn}$ were not observable after 40 hours, the higher molecular weight fraction continued to grow, as indicated by the high $\overline{Mn}$ and $\overline{Mz}$ values, determined by GPC.

These results are evidence of the extremely high molecular weight, soluble polymers obtained by direct ammonolysis followed by catalytic chain extension and crosslinking. The polymer viscosity increases dramatically during the reaction, starting at $\sim 1.0$ poise and ending at $\sim 400–4500$ poise. All samples except the 100-hour aliquot behave in a Newtonian fashion. The 100-hour sample shows a non-Newtonian viscosity between 4780 poise at a shear rate of 1.0 sec$^{-1}$ and 400 poise at a shear rate of 10.0 sec$^{-1}$.

EXAMPLE III

Polycyclomethylsilazane (PCMS) was also formed for use as a preceramic polymer coating in the following manner. Anhydrous diethyl ether (500 ml) was added to a 2-liter, 3-necked flask equipped with an overhead mechanical stirrer and a nitrogen inlet-outlet adapter while completely purged with nitrogen. The flask was cooled to $-70°$ C. with a dry ice/acetone bath. $CH_3SiHCl_2$ (172.5 g, 1.5 mol; distilled from Mg under nitrogen) was then cannulated into the flask. Ammonia dried over a KOH trap was bubbled into the chlorosilane solution. A white precipitate began forming immediately. The reaction was stirred for 4 hours at $-70°$ C. and then for 2 more hours after the cooling bath was removed. The flask was disconnected under nitrogen and transformed into a dry box for vacuum filtration. The ammonium salt cake was extracted with hot, dry THF as for ONMS. A very pale yellow viscous liquid (70.3 g, 79%) was obtained after removal of the solvent ($10^{-2}$ mm, 35° C.). The molecular weight (Mn) of the liquid was 721 Daltons as determined by VPO.

To 5 g of the OCMS prepared above was added 10 mg $Ru_3(CO)_{12}$ and the solution was stirred under nitrogen at 60° C. Gas evolution was apparent as the liquid became more viscous. Samples were removed from the reaction at various intervals. The reaction was carried on for 13 hours until the solution became a very viscous polymer. The product is soluble in organic solution and is evaluated for its chemical, polymer, and pyrolytic characteristics. The molecular weight ($\overline{Mn}$) of the polymerized polycyclomethylsilazane product after 13 hours was 2000 Daltons.

EXAMPLE IV

Aminated poly-N-methylsilazane (APNMS) was also prepared for use as a preceramic coating material. PNMS (15 g) was added to 15 g anhydrous THF in a 45-mL Parr bomb reactor under nitrogen. The reactor was sealed, flushed with ammonia, and then repressurized with ammonia to 200 psi. The reactor was then placed in a 90° C. oil bath, and the solution was stirred magnetically. As the reaction proceeded, the pressure was released and ammonia was added periodically every 2 hours in portions of 200 psi to continue the dehydrocoupling process. The reaction was carried on for 8 hours. The resulting polymer is a gel type polymer and transforms into intractable product after solvent removal.

EXAMPLE V

A number of non-annealed Owens Illinois R6 soda-lime silica glass rods having an annealing point of about 590° C. and a softening point of about 610° C., and having a diameter of 3 mm. and 8 cm. in length, were coated with preceramic coatings formulated by dissolving various amounts of the materials formed in Examples I–IV in tetrahydrofuran, pyrolyzed, and then tested to determine their increase in rupture strength. In each instance identical "blank" rods were subjected to the same heat treatment in an uncoated state and the rupture strength also measured and compared to the nominal 18.2 kpsi ±2.3 kpsi of the rods in an as received state.

In this particular test, none of the rods were annealed in advance. In each instance, the rods were pyrolyzed in a nitrogen atmosphere at a temperature of 590° C., the softening temperature of the soda-lime glass. Except where indicated by an asterisk, the coated rods (and blanks) were heated to 580–590° C. at a rate of about 30° C./hour. The samples noted with an asterisk were flash pyrolyzed by heating the rod at a rate of approximately 3300° C./hour by placing the rod in a furnace already preheated to 590° C. The dwell time at the maximum temperature was 200 minutes and the cooling rate was 9°/minute.

The respective coatings, applied at different concentrations (in weight percent) to the rods, were PNMS, (poly-N-methylsilazane); ONMS, (an oligimer of N-methylsilazane); PCMS, (polycyclomethylsilazane); and APNMS, (aminated poly-N-methylsilazane). In each instance, the polymer was dissolved to the concentration indicated in a tetrahydrofuran solvent. The rupture strengths (in kpsi) are shown for the various coated and uncoated rods in Table I below. Each value listed is a composite or average of at least 9 of rods treated similarly. The rods were tested for rupture strength in accordance with the four-point bend test of ASTM C158.

TABLE I

| Exp. No. | Coating Polymer | Polymer Conc.. | Rupture strength Coated Rod (kpsi) |
|---|---|---|---|
| 1 | Uncoated | (blank) | 25.9 ± 4.6 |
| 2 | PNMS | 2.5 | 50.6 ± 10.6 |
| 3 | PNMS | 5.0 | 60.1 ± 8.3 |
| 3a | PNMS | 5.0* | 58.0 ± 14.6 |
| 4 | PNMS | 10.0 | 49.2 ± 7.3 |
| 5 | ONMS | 5.0 | 55.8 ± 9.1 |
| 6 | ONMS | 10.0 | 70.0 ± 12.2 |
| 6a | ONMS | 10.0* | 49.6 ± 11.8 |
| 7 | ONMS | 15.0 | 59.0 ± 22.8 |
| 8 | PCMS | 2.5 | 66.2 ± 9.8 |
| 9 | PCMS | 5.0 | 63.6 ± 12.8 |
| 10 | PCMS | 10.0 | 49.0 ± 18.2 |
| 11 | APNMS | 2.5 | 54.1 ± 10.4 |
| 12 | APNMS | 5.0 | 51.9 ± 8.7 |

*heated at a rate of 3300° C./hour up to pyrolysis temperature of 590° C.

Figure 1:
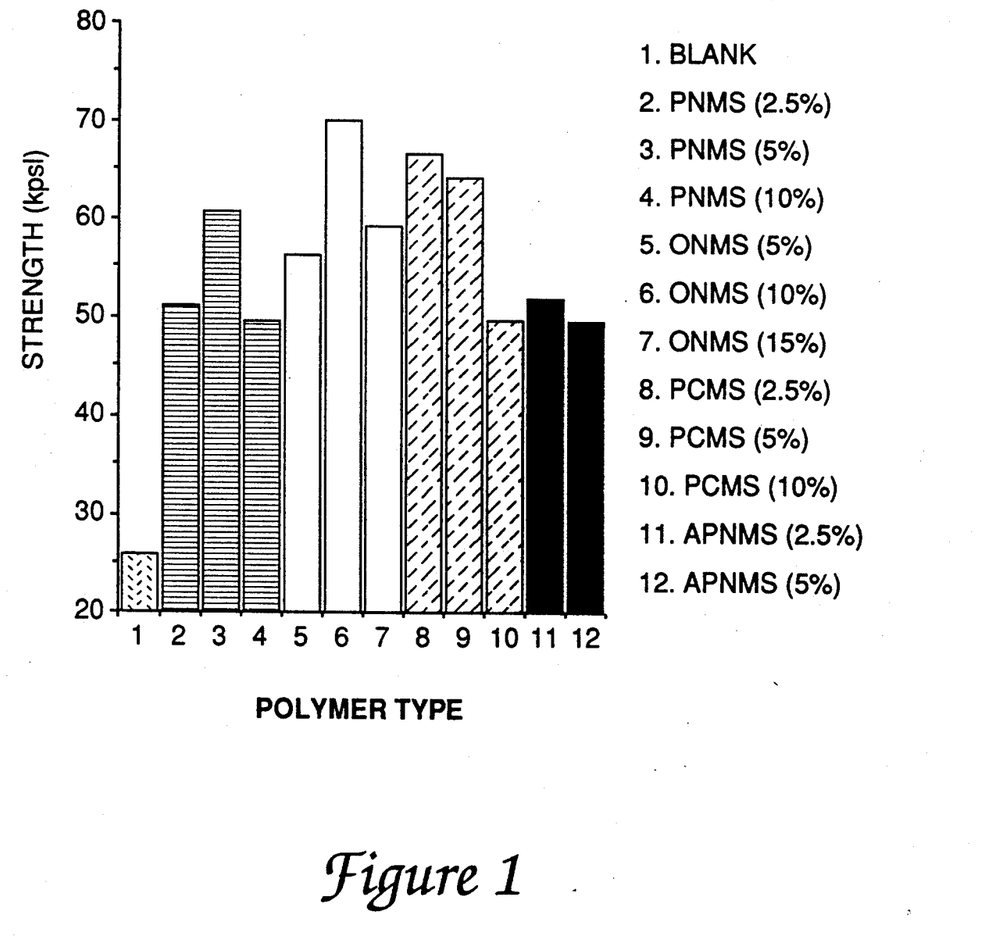
FIG. 1 is a graph showing the rupture strengths attained by coating a glass material with various concentrations of various preceramic polymer coating materials.

The results, as depicted in the graphs in FIG. 1 indicated the marked increase in rupture strength attained by the ceramic coated glass rods in contrast to the uncoated rods which were subjected to the same heat treatments. It will be further noted that the highly polymerized coatings of high molecular weight (the PNMS, PCMS, and APNMS polymers) provided a sufficiently ceramic yield when used at 2.5 and 5 wt. % to provide optimum strength increase at such coating weights, while the less polymerized oligomer required concentrations of 10 wt. % to provide a high enough ceramic yield to result in the optimum increase. In each instance, it will be noted that there is an optimal concentration above and below which the resultant rupture strength actually decreases. Similar results were obtained using ammonia, dry air, and moist air atmospheres instead of $N_2$, with the strengths for rods pyrolyzed under a moist atmosphere slightly lower in values.

EXAMPLE VI

To 10 grams of cyclotetrahydridomethylsiloxane $(CH_3SiHO)_4$, in 20 grams of THF were added 0.67 grams of $H_2O$ and 20 mg of $Ru_3(CO)_{12}$, and the solution was heated to 60° C. under $N_2$. After 3 hours, the evolution of gas ($H_2$) was completed. After removal of solvent, a vicous-waxy polymer, polycyclohydridomethylsiloxane (PHMSO) was obtained which slowly continued to crosslink and converted to a solid product which was still soluble in THF. The resulting polymer can be pyrolyzed under nitrogen or oxygen to give a high yield of an amorphous ceramic composition consisting of silica and potentially carbon and is useful as a preceramic coating composition in the practice of the invention.

EXAMPLE VII

To further illustrate that the additional strength imparted to the respective glass materials derives from the ceramic coating and not from heat treatments, a series of tests were run on rods similar to those described in Example V, except that one series of rods were annealed at 590° C. for approximately 6 hours and the other set was not. In each instance the rods were coated with the poly-N-silazane polymer of Example II dissolved in tetrahydrofuran at either 5 or 10 wt. % concentration. Three different pyrolysis temperatures were used, 500° C., 550° C., and 590° C. In each instance denoted by an S, a temperature rise of 30° C./hour was used to raise the coated rod to the designated pyrolysis temperature. Where showed as an F, the temperature ramp up rate was 300° C./hour.

Figure 2:
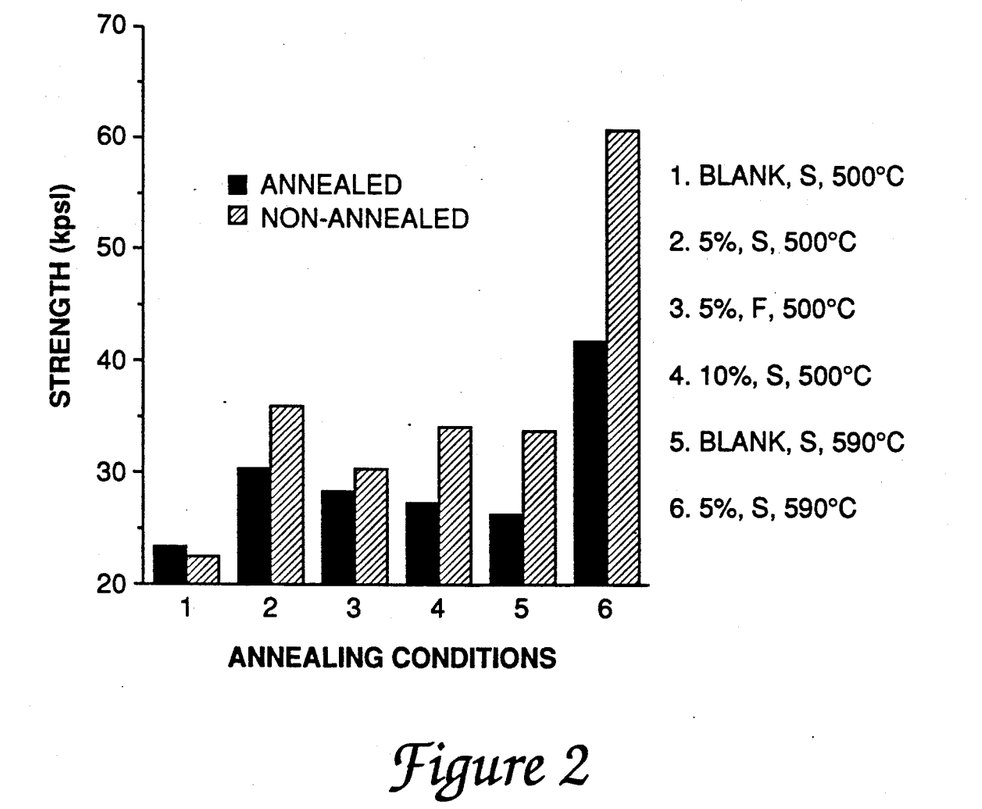
FIG. 2 is a graph showing the rupture strengths attained by respectively coating annealed and unannealed glass material with a preceramic polymer coating material under various conditions.
Figure 3:
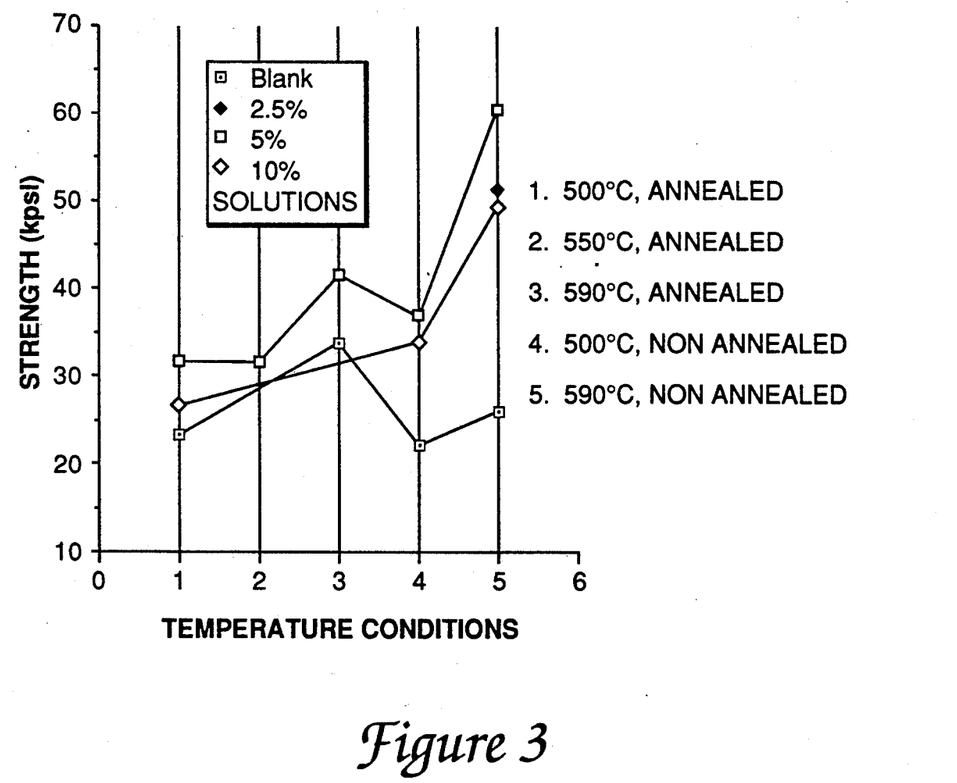
FIG. 3 is a graph showing the rupture strengths attained by pyrolyzing at three different temperatures annealed and unannealed glass materials coated with various concentrations of a preceramic polymer coating material.

In all instances, the pyrolysis was carried out under a nitrogen atmosphere with a dwell time at the pyrolysis temperature of 200 minutes and a cool down rate of 540° C./hour (9.1° C./minute). The results are graphed in FIGS. 2 and 3. It will be seen that except for the blank (uncoated) rods annealed at 500° C., annealing did not improve the rupture strength of the rods as opposed to the unannealed rod. In all instances where the rods were coated in accordance with the invention to provide a ceramic coating on the glass rod, the unannealed rods yielded a higher increase in rupture strength than the annealed rods when similarly processed subsequent to annealing. Of particular interest are the results shown in number 6 in FIG. 1, wherein the coated rods were annealed at 590° C., i.e., the annealing temperature of the glass, wherein the increases in rupture strength are markedly higher for the ceramic coatings on the unannealed rods.

EXAMPLE VIII

To further illustrate the relationship between the heating rate and the ultimate increase in rupture strength of glass rods similar to those described in Example V, a series of nonannealed rods were coated with a preceramic coating comprising a 5 wt. % PNMS polymer of similar molecular weight to that described in Example V and dissolved in tetrahydrofuran. In each instance the rods were annealed at 590° C. in a nitrogen atmosphere. The dwell time at this pyrolysis temperature was 200 minutes in each instance and the cooling rates were also held constant at 540° C./hour. The rupture strength was tested in the manner previously described.

Figure 4:
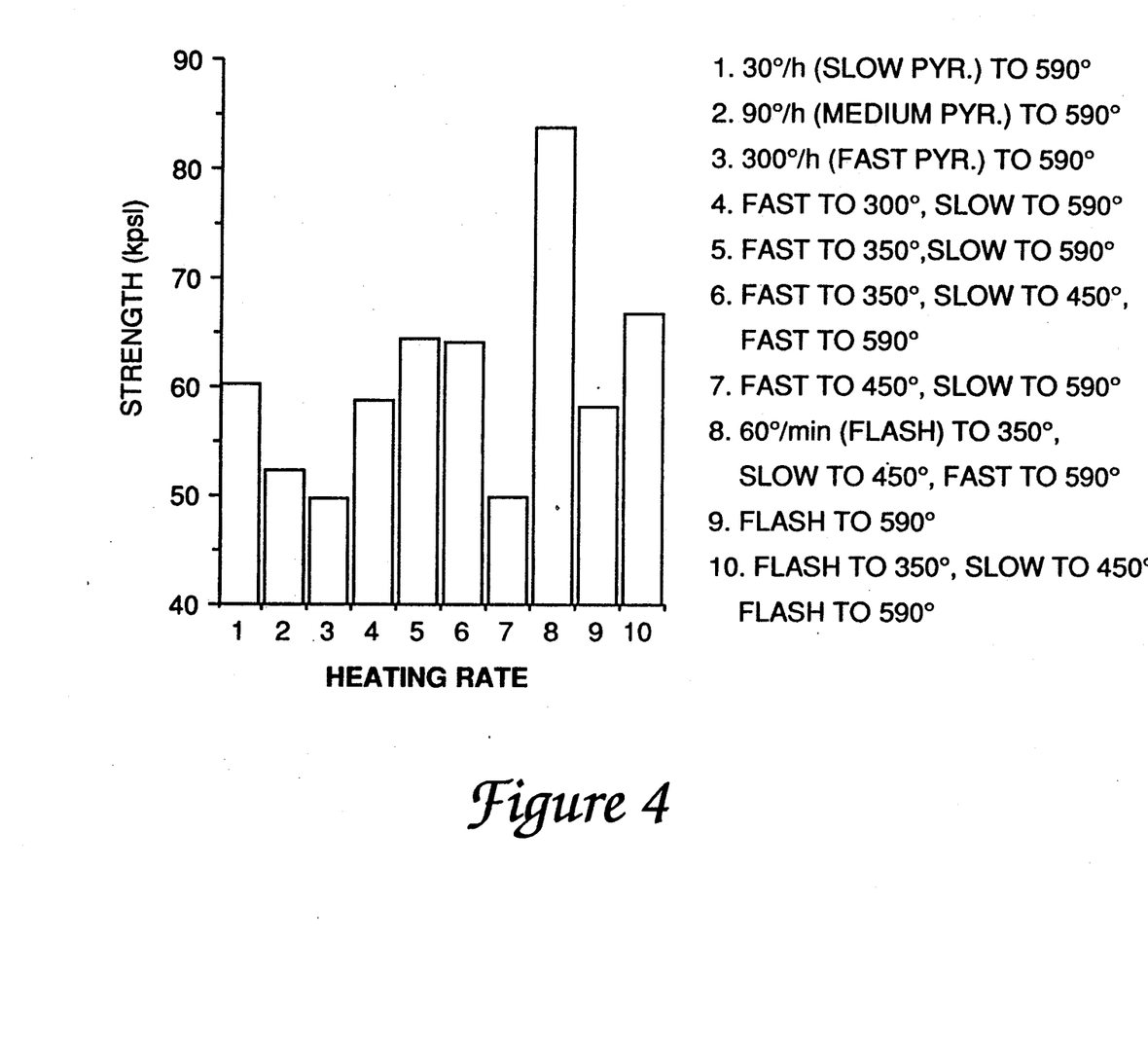
FIG. 4 is a graph showing the rupture strengths attained by heating a glass material coated with a preceramic polymer coating material at various rates up to the pyrolysis temperature.

However, the heating or ramp up rates were varied, as shown in the graph of FIG. 4 with slow being defined at a rate of 30° C./hour, medium being 90° C./hour, fast being 300° C./hour, and flash being a heating rate of 3300° C./hour (by introducing the coated rods into a preheated oven). As can be seen in the graph (bars 1, 4–6, 8, and 10), it appears that a lower rate of heating between the range of 350° C. to 450° C. seems to results in the attainment of a higher ultimate rupture strength.

EXAMPLE IX

To further illustrate the relationship between the ultimate rupture strength achieved versus the dwell time at the pyrolysis temperature and the cooling rate, a number of non-annealed soda-lime glass rods similar to those described in Example V were coated with a 5 wt. % PNMS polymer of molecular weight similar to that described in Example V and dissolved in tetrahydrofuran solvent. The glass rods were coated in an unannealed state and heated to a pyrolysis temperature of 590° C. at a rate of 30° C./hour. The coated rods were then subjected to various dwell times and cooling rates after which they were tested for strength as previously described. In bar 7 of FIG. 5, the rods were subjected to two heat cycles, each at a rate of 30° C./hour to 590° C. followed by a dwell time of 200 minutes and a cooling rate of 9°/minute.

Figure 5:
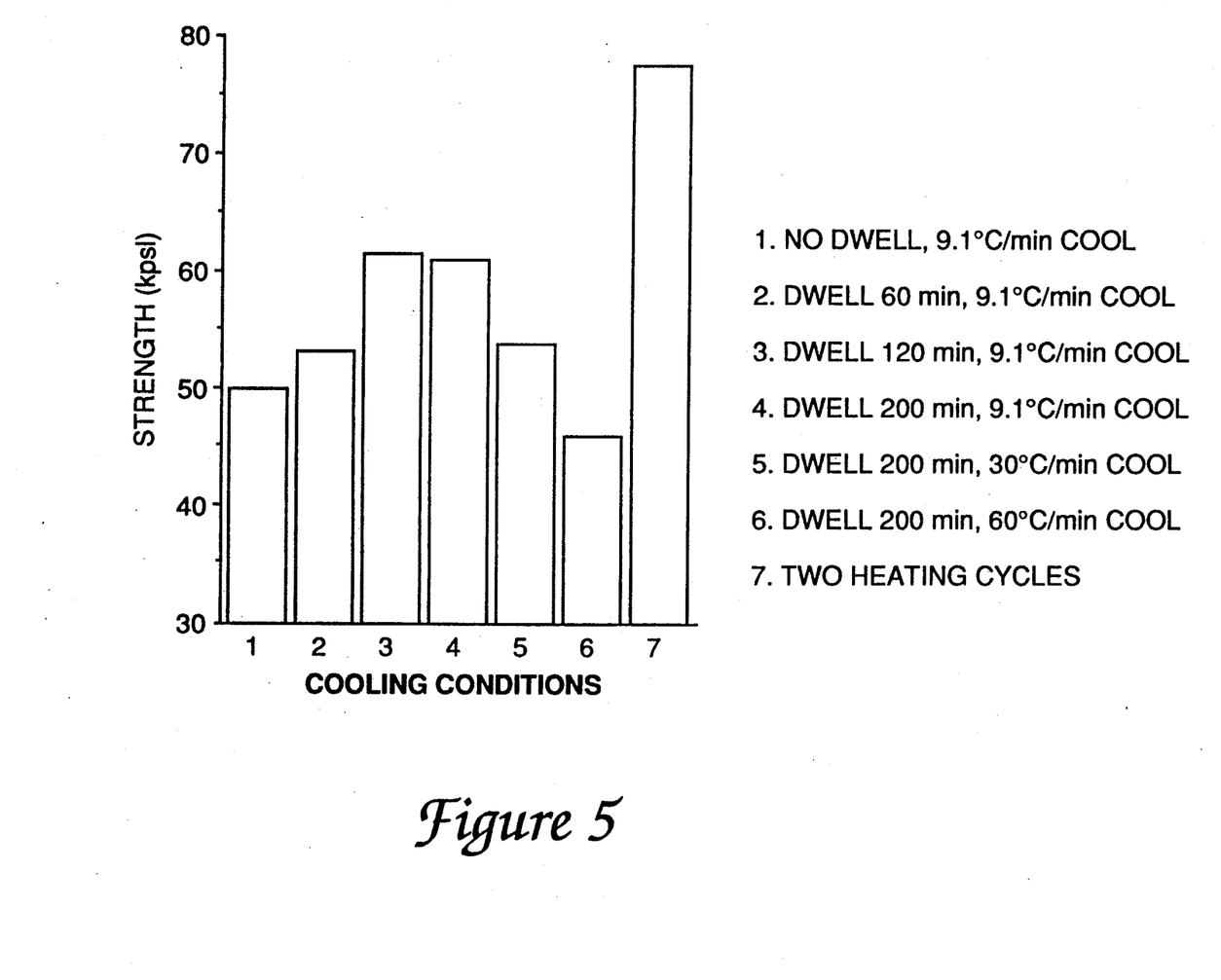
FIG. 5 is a graph showing the rupture strengths attained by varying the dwell time and cooling rate of a glass material coated with a preceramic polymer coating material and heated up to the pyrolysis temperature.

It will be seen in FIG. 5 that better results were attained when there was a minimum dwell time of at least 60 minutes, preferably 120 minutes, and a cooling rate slower than 30° C./minute.

EXAMPLE X

Figure 6:
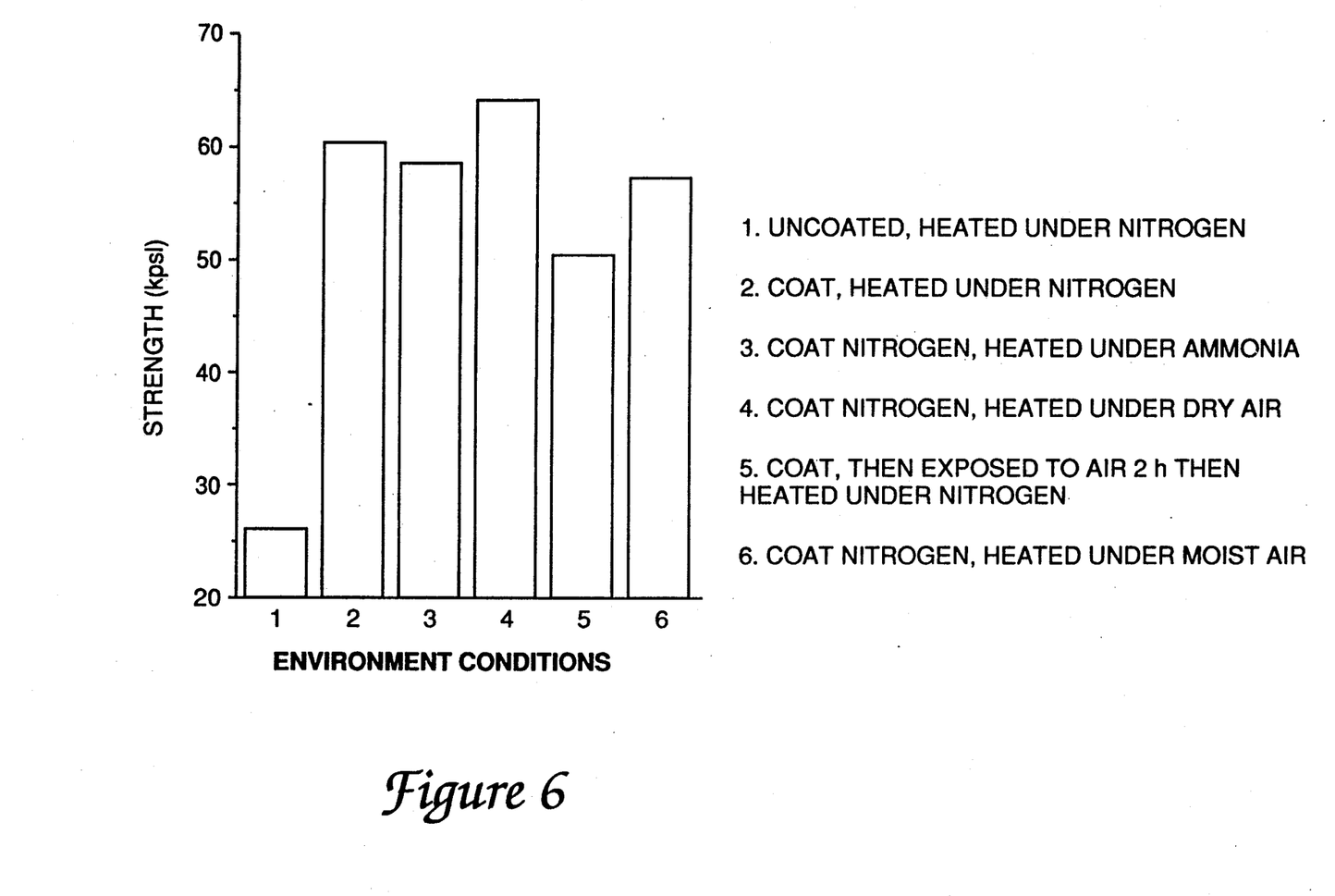
FIG. 6 is a graph showing the rupture strengths attained by varying the atmosphere in which a glass material is coated with a preceramic polymer coating material and heated up to the pyrolysis temperature.
Figure 7:
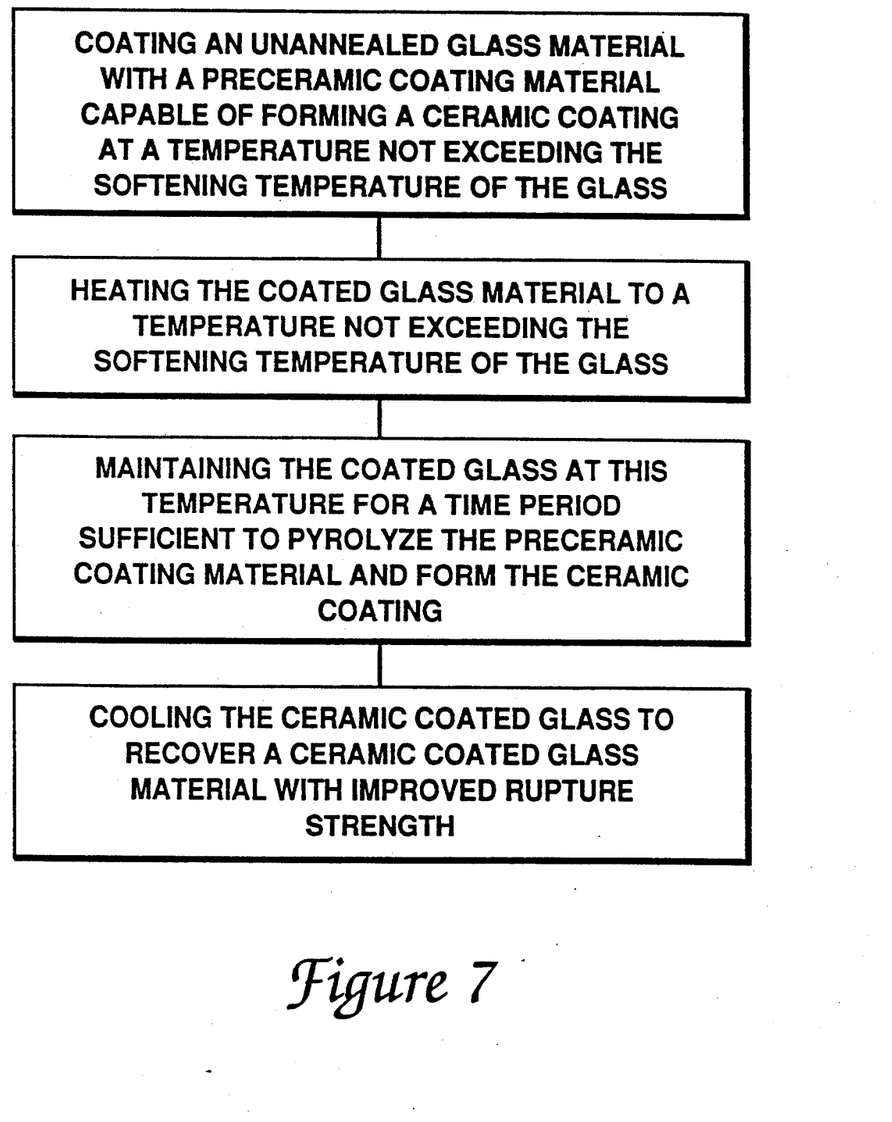
FIG. 7 is a flow sheet illustrating the process of the invention.

To further illustrate the relationship between the ultimate rupture strength achieved versus the atmosphere used during the coating and pyrolysis steps, a number of soda-lime glass rods similar to those described in Example V were coated with a 5 wt. % PNMS polymer of molecular weight similar to that described in Example V and dissolved in tetrahydrofuran solvent. The glass rods were coated in an unannealed state and heated to a pyrolysis temperature of 590° C. at a rate of 30° C./hour, using various combinations of dry air, moist air, nitrogen, and ammonia as shown in FIG. 6. In each instance, the coated rods were held at the pyrolysis temperature for 200 minutes and then cooled at 540° C./hour (9.1° C./minute). The coated rods were then tested for strength as previously described. It will be noted from the graph of FIG. 6, that the variation in atmosphere had little affect on the strength on the rupture strength achieved by forming a ceramic coating on the glass in accordance with the invention, despite the fact that the coating compositions, after pyrolysis, should be entirely different.

EXAMPLE XI

A number of non-annealed Owens Illinois R6 soda-lime silica glass rods having an annealing point of about 590° C. and a softening point of about 610° C., and having a diameter of 3 mm. and 8 cm. in length, were coated with preceramic polysiloxane-derived coatings dissolved in tetrahydrofuran, pyrolyzed, and then tested to determine their increase in rupture strength. In each instance identical "blank" rods were subjected to the same heat treatment in an uncoated state and the rupture strength also measured and compared to the nominal 18.2 kpsi ±2.3 kpsi of the rods in an as received state.

As in Example V, none of the rods were annealed in advance. In each instance, the rods were pyrolyzed in a nitrogen atmosphere at a temperature of 590° C., the softening temperature of the soda-lime glass. Except where indicated by an asterisk, the coated rods (and blanks) were heated to the softening temperature at a rate of about 30° C./hour. The samples noted with an asterisk were flash pyrolyzed by heating the rod at a rate of approximately 3300° C./hour by placing the rod in a furnace already preheated to 580° C. The dwell time at the maximum temperature was 200 minutes and the cooling rate was 9°/minute.

The respective coatings, applied at different concentrations (in weight percent) to the rods, were polymethylsilsesquioxane, [MeSiO$_{1.5}$]$_n$ purchased from Petrarch Systems, Inc. and polyhydridomethylsiloxane, [MeSiHO]$_m$[MeSiO$_{1.5}$]$_n$. In each instance, the polymer was dissolved to the concentration indicated in a tetrahydrofuran solvent. The rupture strengths (in kpsi) for the various coated and the factor of improvement over identically processed uncoated rods (listed as blank) are shown in Table II below. Each value listed is a composite or average of at least 9 of 12 rods treated similarly. The rods were tested for rupture strength in accordance with the four-point bend test of ASTM C158.

TABLE II

| Exp. No. | Coating Polymer | Polymer Conc. | Pyrolysis Atmosphere | Pyrolysis Temperature | Rupture Strength Coated Rod (kpsi) |
|---|---|---|---|---|---|
| 1 | Uncoated | (Blank) | N$_2$ | 590° C. | 25.9 ± 4.6 |
| 2 | [MeSiO$_{1.5}$]$_n$ | 10.0% | N$_2$ | 590° C. | 34.1 ± 6.9 |
| 3 | [MeSiO$_{1.5}$]$_n$ | 5.0% | N$_2$ | 590° C. | 44.2 ± 10.9 |
| 4 | [MeSiO$_{1.5}$]$_n$ | 5.0% | Air | 590° C. | 45.6 ± 12.4 |
| 5 | [MeSiHO]$_m$[MeSiO$_{1.5}$]$_n$ | 5.0% | Dry Air | 580° C.* | 40.3 ± 8.8 |
| 6 | [MeSiHO]$_m$[MeSiO$_{1.5}$]$_n$ | 5.0% | Dry Air | 580° C.* | 49.3 ± 14.4 |

*Heated at a rate of 3300° C./hour up to pyrolysis temperature of 590° C.

The results indicate that coating glass materials with polysiloxane-based preceramic coating materials also provides marked improvement in the rupture strength of the glass after pyrolysis to form the desired ceramic coating on the glass in accordance with the invention.

Thus, the invention provides a glass material with an improved rupture strength formed by coating a glass material with a preceramic coating material capable of providing a high ceramic yield upon pyrolysis of the coating at an elevated temperature up to the softening temperature of the glass material.

Having thus described the invention, what is claimed is:

1. A method for improving the rupture strength of a glass material by at least about 100% which comprises:
   a) forming a tractable organometallic polymeric preceramic liquid coating solution by dissolving in an organic solvent an organometallic polymeric preceramic coating material to provide a liquid preceramic coating solution:
      1) capable of pyrolyzing to form a ceramic coating selected from the class consisting of silicides, borides, nitrides, carbides, and oxides at a temperature not exceeding the softening temperature of the glass material;
      2) capable of providing a ceramic yield of at least 35 wt. %;
      3) having a viscosity, after application to the glass material and removal of solvent, of at least 1 poise; and
      4) capable of wetting and adhering to the glass material to form a uniform coating on the surface of the glass material; and
   b) coating an unannealed glass material with said preceramic liquid coating solution;
   c) heating said coated glass material in atmosphere selected from the group consisting of an inert atmosphere and a nitrogen-containing atmosphere, to a pyrolysis temperature of from about 300° C. to about 10° C. below the softening temperature of the glass to permit pyrolysis of the preceramic coating material without exceeding the softening temperature of said glass material; and
   d) maintaining said coated glass material at said pyrolysis temperature for a period of time sufficient to form the ceramic coating and remove those portions of said coating material which do not participate in forming said ceramic coating.

2. The method of claim 1 wherein said step of coating said glass material with said organometallic polymeric preceramic liquid coating solution further comprises coating said glass material with an amount of said organometallic polymeric preceramic coating material sufficient to form a ceramic coating, after said pyrolysis step, having a thickness of from about 0.1 to about 0.5 microns.

3. The method of claim 1 wherein said step of coating said glass material with said organometallic polymeric preceramic liquid coating solution is repeated at least one additional time.

4. The method of claim 1 wherein said pyrolysis step further comprises heating said coated glass material at a rate of from about 30° C. per hour up to a rate of about 3300° C. per hour up to said pyrolysis temperature.

5. The method of claim 4 wherein said pyrolysis step further comprises heating said coated glass material at a rate not exceeding about 30° C. per hour between the temperatures of about 350° C. to about 450° C.

6. The method of claim 4 wherein said pyrolysis step further comprises heating said coated glass material up to a temperature of about 300° C. at a rate of up to about 3300° C. per hour.

7. The method of claim 4 wherein said pyrolysis step further comprises heating said coated glass material from a temperature of about 300° C. to about 350° C. at a rate of about 300° C. per hour.

8. The method of claim 4 wherein said pyrolysis step further comprises heating said coated glass material from a temperature of about 450° C. up to the pyrolysis temperature at a rate of about 300° C. per hour.

9. The method of claim 4 wherein said pyrolysis step further comprises heating said coated glass material up to said pyrolysis temperature by inserting said coated glass material into a pyrolysis zone already preheated to said pyrolysis temperature.

10. The method of claim 1 wherein said maintaining step further comprises maintaining said coated glass material at said pyrolysis temperature for a period of time of at least about 5 minutes.

11. The method of claim 1 wherein said maintaining step further comprises maintaining said coated glass material at said pyrolysis temperature for a period of time of at least about 60 minutes.

12. The method of claim 1 wherein said maintaining step further comprises maintaining said coated glass material at said pyrolysis temperature for a period of time of at least about 120 minutes.

13. The method of claim 1 including the further step of cooling said coated glass material from said pyrolysis temperature down to a temperature of about 200° C. at a rate not exceeding about 60° C. per minute.

14. The method of claim 1 including the further step of cooling said coated glass material from said pyrolysis temperature down to a temperature of about 200° C. at a rate not exceeding about 30° C. per minute.

15. The method of claim 1 including the further step step of cooling said coated glass material from said pyrolysis temperature down to a temperature of about 200° C. at a rate not exceeding about 10° C. per minute.

16. The method of claim 1 wherein said preceramic coating material comprises a polymer coating material selected from the class consisting of polysilazane, polysiloxazane, and polysiloxane.

17. The method of claim 1 wherein said preceramic coating material is a polymer selected from the class consisting of poly-N-methylsilazane, aminated poly-N-methylsilazane, polycyclomethylsilazane, aminated polycyclomethylsilazane, polymethylhydridosiloxane, and polymethylsequisiloxane.

18. A method for improving the rupture strength of a glass material by at least about 100% which comprises:
   a) forming a tractable silicon-based organometallic polymeric preceramic liquid coating solution by dissolving in an organic solvent a tractable preceramic coating material selected from the class consisting of polysilazane, polysiloxazane, and polysiloxane to form a liquid coating solution:
      1) capable of pyrolyzing to form a ceramic coating at a temperature not exceeding the annealing temperature of the glass material;
      2) having a sufficient molecular weight to provide a ceramic yield of at least 35 wt. %;
      3) being a liquid having a minimum viscosity, after application to the glass material and removal of solvent, of at least 1 poise; and
      4) capable of forming a uniform coating on the surface of the glass material;
   b) applying a coating of said silicon-based organometallic polymeric preceramic liquid coating solution on an unannealed glass material;
   c) heating said coated glass material in atmosphere selected from the group consisting of an inert atmosphere and a nitrogen-containing atmosphere to a pyrolysis temperature of from at least about 500° C. to about 10° C. below the softening temperature of the glass to permit pyrolysis of said preceramic coating material without exceeding the softening temperature of the glass;
   d) maintaining said coated glass material at said pyrolysis temperature for a period of time of at least about 45 minutes to form the ceramic coating and remove portions of the silicon-based organometallic polymer which do not form the ceramic coating; and
   e) cooling said coated glass material down to a temperature of about 200° C. at a rate not exceeding about 30° C. per minute.

19. A method for improving the rupture strength of a glass material by at least about 100% which comprises:
   a) forming a tractable silicon-based organometallic polymeric preceramic liquid coating solution by dissolving in an organic solvent of tetrahydrofuran a tractable preceramic coating material selected from the class consisting of polysilazane, polysiloxazane, and polysiloxane;
   b) applying a liquid coating of said silicon-based organometallic polymeric preceramic coating solution on an unannealed glass material;
   c) heating said coated glass material in atmosphere selected from the group consisting of an inert atmosphere and a nitrogen-containing atmosphere, to a pyrolysis temperature of from at least about 500° C. to about 10° C. below the softening temperature of the glass to permit pyrolysis of said preceramic coating material without exceeding the softening temperature of the glass;
   d) maintaining said coated glass material at said pyrolysis temperature for a period of time of at least about 45 minutes to form the ceramic coating and remove portions of the silicon-based organometallic polymer which do not form the ceramic coating; and
   e) cooling said coated glass material down to a temperature of about 200° C. at a rate not exceeding about 30° C. per minute.

* * * * *